US012756925B2

(12) United States Patent
Imai et al.

(10) Patent No.: US 12,756,925 B2
(45) Date of Patent: Oct. 6, 2026

(54) ELECTRONIC DEVICE AND CONTROL METHOD OF ELECTRONIC DEVICE

(71) Applicant: CANON KABUSHIKI KAISHA, Tokyo (JP)

(72) Inventors: Yuko Imai, Tokyo (JP); Daiyu Ueno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 19/076,228

(22) Filed: Mar. 11, 2025

(65) Prior Publication Data

US 2025/0301213 A1 Sep. 25, 2025

(30) Foreign Application Priority Data

Mar. 19, 2024 (JP) ................................ 2024-044015

(51) Int. Cl.

| | |
|---|---|
| ***H04N 23/63*** | (2023.01) |
| ***G03B 17/20*** | (2021.01) |
| ***G03B 17/56*** | (2021.01) |

(52) U.S. Cl.

CPC ........... *H04N 23/634* (2023.01); *G03B 17/20* (2013.01); *G03B 17/561* (2013.01); *G03B 17/563* (2013.01); *G03B 2217/002* (2013.01)

(58) Field of Classification Search

CPC .... H04N 23/634; H04N 23/62; H04N 23/667; H04N 23/633; G03B 17/20; G03B 17/561; G03B 17/563; G03B 2217/002

See application file for complete search history.

(56) References Cited

U.S. PATENT DOCUMENTS

| | | | | |
|---|---|---|---|---|
| 2013/0265456 | A1* | 10/2013 | Cho | H04N 23/667 348/211.99 |
| 2016/0162007 | A1* | 6/2016 | Kim | G06F 1/163 713/323 |
| 2016/0299010 | A1* | 10/2016 | Park | G06F 3/041 |
| 2020/0249820 | A1* | 8/2020 | Choi | G06F 3/04886 |
| 2024/0205526 | A1* | 6/2024 | Ueda | G01K 13/00 |
| 2024/0323515 | A1* | 9/2024 | Kitai | H04N 23/634 |
| 2025/0124430 | A1* | 4/2025 | Snyder | G06Q 20/3821 |

FOREIGN PATENT DOCUMENTS

| | | |
|---|---|---|
| JP | 2003215691 A | 7/2003 |
| JP | 2013098648 A | 5/2013 |

* cited by examiner

*Primary Examiner* — Hung H Lam

(74) *Attorney, Agent, or Firm* — Cowan, Liebowitz & Latman, P.C.

(57) ABSTRACT

An electronic device according to the present invention includes a processor, and a memory storing a program which, when executed by the processor, causes the electronic device to execute measurement processing of measuring a temperature of the electronic device, execute detection processing of detecting a specific state wherein the electronic device is not gripped, and execute control processing of performing control to perform a first notification if the specific state is detected, and performing control to perform a second notification more conspicuous than the first notification if the specific state is not detected, in a case where the temperature of the electronic device is higher than a threshold value.

13 Claims, 6 Drawing Sheets

ELECTRONIC DEVICE AND CONTROL METHOD OF ELECTRONIC DEVICE

BACKGROUND OF THE INVENTION

Field of the Invention

The present invention relates to an electronic device and a control method of the electronic device, and particularly relates to a technique for notifying a warning.

Description of the Related Art

An imaging apparatus such as a mirrorless camera notifies a user of a warning when a temperature rises, an abnormality in operation, or the like is detected.

JP 2013-98648 A discloses a technique in which warning display is performed regardless of whether a video is being recorded when warning display is performed for the first time, warning display is not performed during recording of the video when the warning display is not performed for the first time, and warning display is performed when recording of the video is stopped. JP 2003-215691 A discloses a technique in which a warning is not issued during half-pressing or full-pressing of a release button, and a warning is issued unless the release button is half-pressing or full-pressing.

However, when a large guidance is always displayed in order to reliably notify the user, for example, it becomes difficult to confirm an object (live view image) by the guidance, which is troublesome for the user and hinders photographing.

SUMMARY OF THE INVENTION

The present invention provides a technique capable of reducing disturbance of a user in notification to the user.

An electronic device according to the present invention includes a processor, and a memory storing a program which, when executed by the processor, causes the electronic device to execute measurement processing of measuring a temperature of the electronic device, execute detection processing of detecting a specific state wherein the electronic device is not gripped, and execute control processing of performing control to perform a first notification if the specific state is detected, and performing control to perform a second notification more conspicuous than the first notification if the specific state is not detected, in a case where the temperature of the electronic device is higher than a threshold value.

Further features of the present invention will become apparent from the following description of exemplary embodiments with reference to the attached drawings.

DESCRIPTION OF THE EMBODIMENTS

Figure 1A:
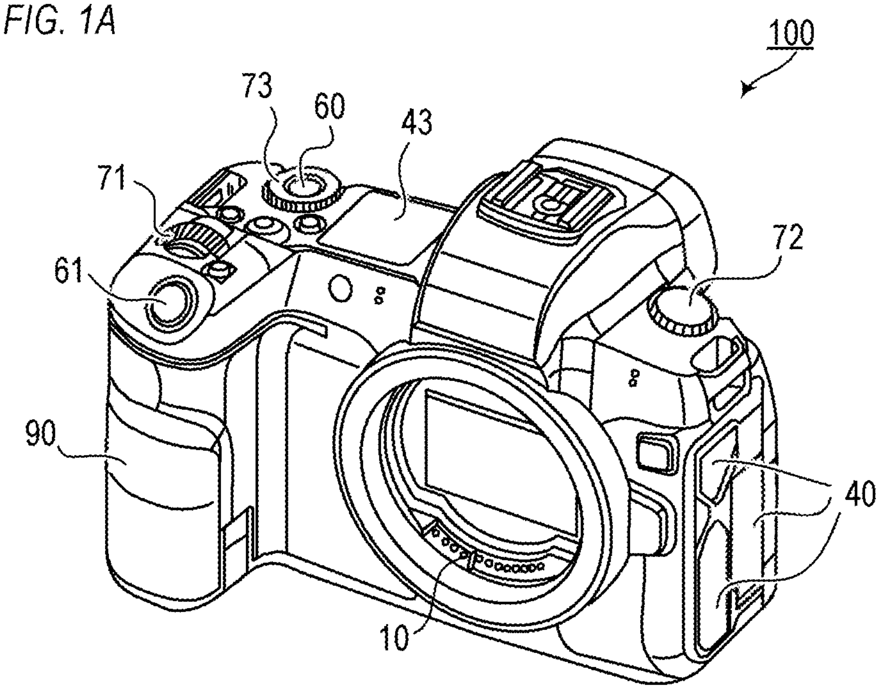
FIGS. 1A and 1B are external views of a digital camera.
Figure 1B:
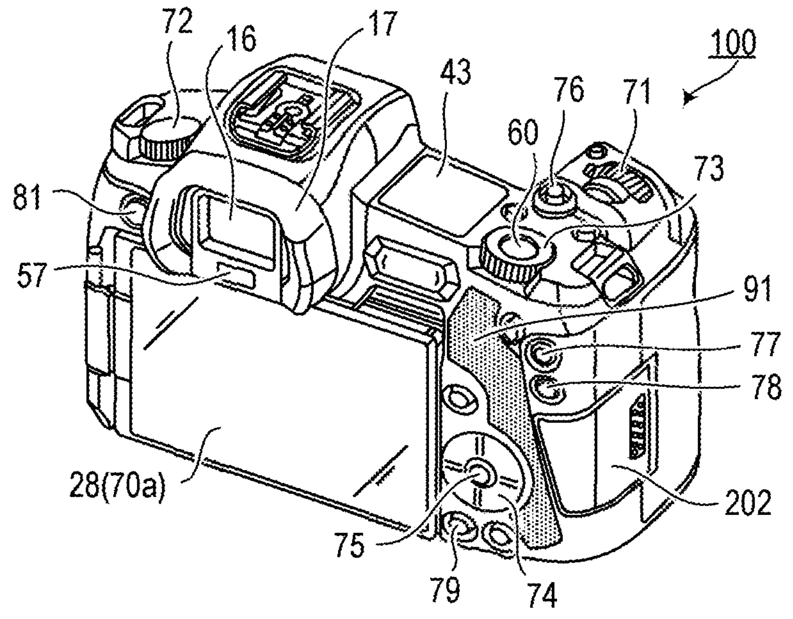

Hereinafter, embodiments of the present invention are described with reference to the drawings. FIGS. 1A and 1B are external views of a digital camera 100 as an example of a device (electronic device or imaging apparatus) to which the present invention can be applied. FIG. 1A is a front perspective view of the digital camera 100, and FIG. 1B is a rear perspective view of the digital camera 100.

A display unit 28 is a display unit provided on the back surface of the digital camera 100 and displays an image and various types of information. A touch panel 70*a* can detect a touch operation on a display surface (touch operation surface) of the display unit 28. An outer finder display unit 43 is a display unit provided on the upper surface of the digital camera 100 and displays various setting values of the digital camera 100 including a shutter speed and an aperture. A shutter button 61 is an operation member for giving a shooting instruction. A mode selector switch 60 is an operation member for switching among various modes. A terminal cover 40 is a cover that protects a connector (not illustrated) with a connection cable or the like that connects the digital camera 100 to an external device.

A main electronic dial 71 is a rotation operation member, and a setting value such as a shutter speed or an aperture can be changed by turning the main electronic dial 71. A power switch 72 is an operation member for switching between ON and OFF of power supply of the digital camera 100. A sub-electronic dial 73 is a rotation operation member, and movement of a selection frame (cursor), image feeding, and the like can be performed by turning the sub-electronic dial 73. A four-direction key 74 is configured to be able to press each of upper, lower, left, and right portions and can perform processing corresponding to a pressed portion of the four-direction key 74. A SET button 75 is a push button and is mainly used to determine a selection item.

A movie button 76 is used for an instruction to start or stop movie shooting (recording). An AE lock button 77 is a push button, and the exposure state can be fixed by pressing the AE lock button 77 in the shooting standby state. An enlargement button 78 is an operation button for switching ON or OFF of an enlargement mode in live view display (LV display) of a shooting mode. By turning ON the enlargement mode and then operating the main electronic dial 71, the live view image (LV image) can be enlarged or reduced. In a playback mode, the enlargement button 78 functions as an operation button for enlarging a playback image or increasing an enlargement ratio. A playback button 79 is an operation member for switching the shooting mode and the playback mode. During the shooting mode, the mode shifts to the playback mode by pressing of the playback button 79, so that the latest one of images recorded in a recording medium 200 (described below) can be displayed on the display unit 28. A menu button 81 is a push button used to perform an instruction operation for displaying a menu screen, and a menu screen on which various settings can be performed is displayed on the display unit 28 when the menu button 81 is pressed. A user can perform various settings instinctively by using the menu screen displayed on the display unit 28, the four-direction key 74, and the SET button 75.

A communication terminal 10 is a communication terminal that causes the digital camera 100 to perform communication with a lens unit 150 (described below; detachable) side. The eyepiece portion 16 is an eyepiece portion of the eyepiece viewfinder 17 (viewing-type finder), and the user can view a video displayed in an EVF 29 (described below;

an electronic viewfinder) via the eyepiece portion 16. An eyepiece detection unit 57 is an eyepiece detection sensor which detects whether the user (photographer) approaches the eyepiece portion 16 with the eyes. A lid 202 is a lid of a slot that stores the recording medium 200 (described below). The grip portion 90 is a holding portion which is formed into a shape in which the user can easily grip the grip portion 90 with the right hand when holding up the digital camera 100. The shutter button 61 and the main electronic dial 71 are arranged at positions where the user can operate the shutter button 61 and the main electronic dial 71 with the index finger of the right hand in a state in which the user holds the digital camera 100 while gripping the grip portion 90 with the little finger, the ring finger, and the middle finger of the right hand. Also, in the same state, the sub-electronic dial 73 is arranged at positions where the user can operate the sub-electronic dial 73 with the thumb finger of the right hand. A thumb rest portion 91 (thumb standby position) is a grip portion provided at a place where it is easy for the user to place the thumb finger of the right hand that grips the grip portion 90 on the back side of the digital camera 100 in a state in which any of the operation members is not operated. The thumb rest portion 91 is configured with a rubber member for enhancing the holding power (gripping feeling).

Figure 2:
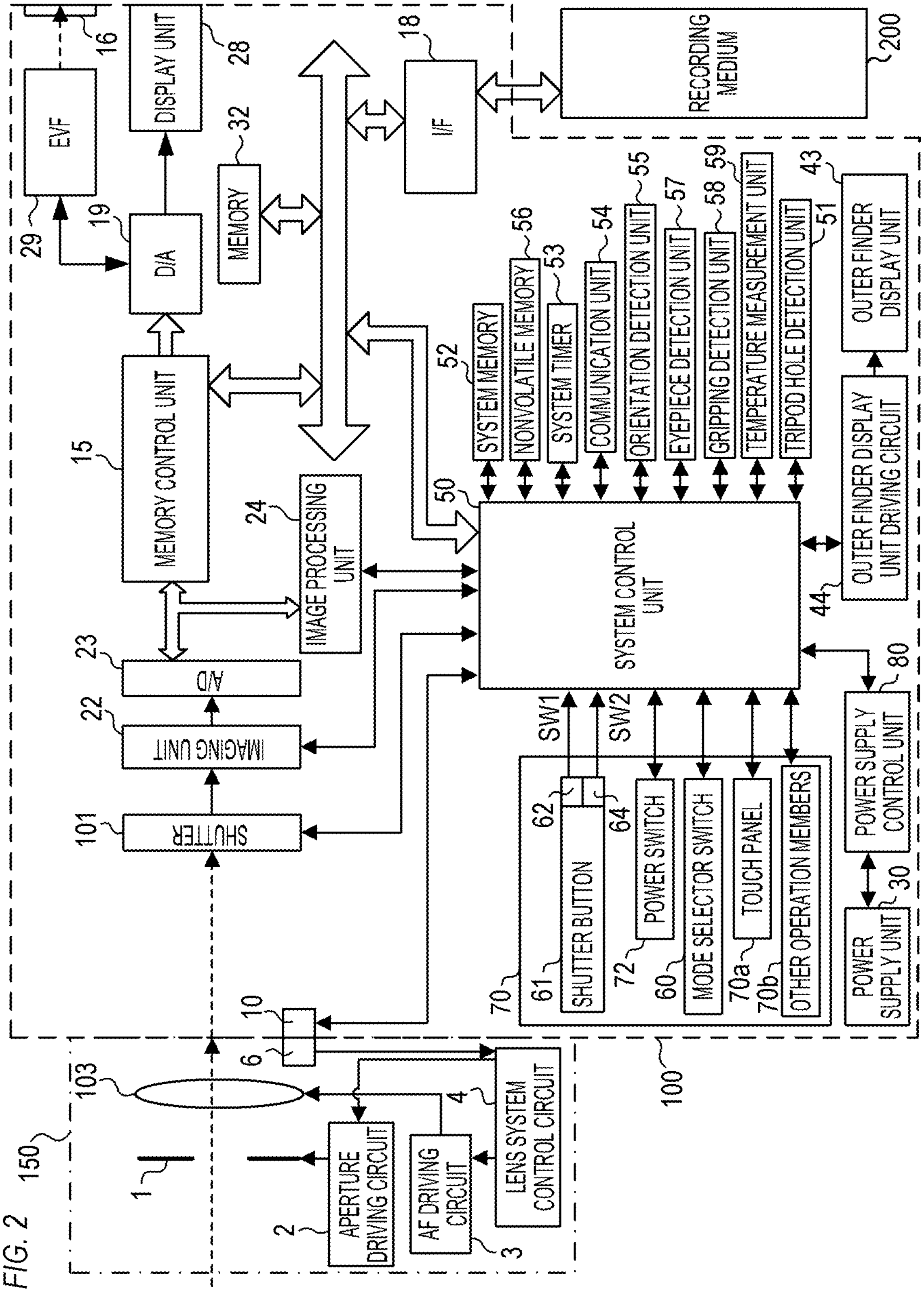
FIG. 2 is a block diagram of a digital camera.

FIG. 2 is a block diagram illustrating a configuration of the digital camera 100. The lens unit 150 is a lens unit equipped with an interchangeable imaging lens. A lens 103 is usually configured with a plurality of lenses, but FIG. 2 illustrates only one lens in a simplified manner. A communication terminal 6 is a communication terminal that causes the lens unit 150 to communicate with the digital camera 100 side, and the communication terminal 10 is a communication terminal that causes the digital camera 100 to communicate with the lens unit 150 side. The lens unit 150 communicates with a system control unit 50 via the communication terminals 6 and 10. Then, the lens unit 150 controls an aperture 1 via an aperture driving circuit 2 by a lens system control circuit 4. Further, the lens unit 150 adjusts the focus by changing the lens 103 via an AF driving circuit 3 by the lens system control circuit 4.

A shutter 101 is a focal plane shutter that can freely control the exposure time of an imaging unit 22 under the control of the system control unit 50.

The imaging unit 22 is an imaging element (image sensor) configured with a CCD, a CMOS element, or the like that converts an optical image into an electrical signal. The imaging unit 22 may include an imaging-surface phase-difference sensor for outputting defocus-amount information to the system control unit 50. An A/D converter 23 converts an analog signal output from the imaging unit 22 into a digital signal.

An image processing unit 24 performs predetermined processing (such as pixel interpolation, resizing processing referred to as reduction, and color conversion processing) on data from an A/D converter 23 or data from a memory control unit 15. In addition, the image processing unit 24 performs predetermined arithmetic processing by using captured image data, and the system control unit 50 performs exposure control and distance measurement control based on a calculation result obtained by the image processing unit 24. As a result, through-the-lens (TTL)-type autofocus (AF) processing, auto exposure (AE) processing, flash pre-flash (EF) processing, and the like are performed. Furthermore, the image processing unit 24 performs predetermined arithmetic processing by using the captured image data and performs TTL-type auto white balance (AWB) processing based on the obtained calculation result.

The memory control unit 15 controls transmission and reception of data among the A/D converter 23, the image processing unit 24, and a memory 32. Output data from the A/D converter 23 is written into the memory 32 via the image processing unit 24 and the memory control unit 15. Alternatively, the output data from the A/D converter 23 is written into the memory 32 via the memory control unit 15 without the image processing unit 24. The memory 32 stores the image data that is obtained by the imaging unit 22 and is converted into digital data by the A/D converter 23 and image data to be displayed on the display unit 28 or the EVF 29. The memory 32 has a storage capacity that is large enough to store a predetermined number of still images and movie images and voices in a predetermined time.

In addition, the memory 32 also serves as a memory (video memory) for image display. A D/A converter 19 converts image data for display stored in the memory 32 into an analog signal and supplies the analog signal to the display unit 28 or the EVF 29. Thus, the image data for display that is written into the memory 32 is displayed by the display unit 28 or the EVF 29 via the D/A converter 19. Each of the display unit 28 and the EVF 29 is a display such as an LCD or an organic EL and performs display corresponding to an analog signal from the D/A converter 19. Digital signals that are A/D converted by the A/D converter 23 and are accumulated in the memory 32 are converted into an analog signal in the D/A converter 19, and the analog signals are sequentially transferred to and displayed on the display unit 28 or the EVF 29, whereby live view display (LV) can be performed. Hereinafter, an image displayed in live view display is referred to as a live view image (LV image).

The system control unit 50 is a control unit including at least one processor and/or at least one circuit and controls the entire digital camera 100. The system control unit 50 is a processor and also a circuit. The system control unit 50 implements processing described later by executing a program recorded in the nonvolatile memory 56. In addition, the system control unit 50 also performs display control by controlling the memory 32, the D/A converter 19, the display unit 28, the EVF 29, and the like.

A system memory 52 is, for example, a RAM, and the system control unit 50 loads constants, variables, programs read from the nonvolatile memory 56, and the like for an operation of the system control unit 50 into the system memory 52.

The nonvolatile memory 56 is an electrically erasable and recordable memory and is, for example, an EEPROM. In the nonvolatile memory 56, constants for operations of the system control unit 50, programs, and the like are recorded. The program as used herein is a program for executing various flowcharts described later.

A system timer 53 is a timer unit that counts time used for various controls and time of a built-in clock.

A communication unit 54 transmits and receives a video signal and a voice signal to and from an external device connected thereto wirelessly or via a wired cable. The communication unit 54 is also connectable to a wireless local area network (LAN) and the Internet. In addition, the communication unit 54 can communicate with an external device also via Bluetooth (registered trademark) or Bluetooth Low Energy. The communication unit 54 can transmit an image captured by the imaging unit 22 (including an LV image) and an image recorded in the recording medium 200 and can receive image data and other various types of information from an external device.

An orientation detection unit 55 detects the orientation of the digital camera 100 with respect to the direction of gravity. Based on the orientation detected by the orientation detection unit 55, whether an image shot by the imaging unit 22 is an image shot with the digital camera 100 held in a horizontal position or an image shot with the digital camera 100 held in a vertical position can be determined. The system control unit 50 can add direction information corresponding to the orientation detected by the orientation detection unit 55 to an image file of the image captured by the imaging unit 22 or rotate and record the image. For example, an acceleration sensor, a gyro sensor, or the like can be used as the orientation detection unit 55. It is also possible to detect movement of the digital camera 100 (whether the digital camera 100 is panning, tilting, rolling, lifting, stationary, or the like) by using an acceleration sensor or a gyro sensor which is the orientation detection unit 55.

A tripod hole detection unit 51 detects use of a tripod hole formed in the digital camera 100. Further, the tripod hole detection unit 51 can determine a type of an accessory using the tripod hole by communicating with the accessory. A grip detection unit 58 detects gripping of the digital camera 100. For example, if a pressure-sensitive sensor, an electrostatic sensor, or the like provided on the grip portion 90 or the thumb rest portion 91 is provided, the grip of the digital camera 100 can be detected using these sensors. It is also possible to detect gripping of the digital camera 100 using an acceleration sensor or a gyro sensor. The temperature measurement unit 59 measures the internal temperature of the digital camera 100.

The eyepiece detection unit 57 is an eyepiece detection sensor that detects approach (eyepiece) and separation (eye separation) of an eye (object) (approach detection) with respect to the eyepiece portion 16 of the eyepiece viewfinder 17 (hereinafter, simply referred to as a "finder"). The system control unit 50 switches between display (display state) and non-display (non-display state) of each of the display unit 28 and the EVF 29 according to the state detected by the eyepiece detection unit 57. Specifically, in a case where at least the shooting standby state is established, and a switching setting for a display destination is set to automatic switching, while an eye is not approached, the display is turned on with the display destination set as the display unit 28, and the EVF 29 does not perform display. In addition, while an eye is approached, the display is turned on with the display destination set as the EVF 29, and the display unit 28 does not perform display. For example, an infrared proximity sensor can be used as the eyepiece detection unit 57, and it is possible to detect the approach of any object to the eyepiece portion 16 of the finder 17 incorporating the EVF 29. When an object approaches, infrared light emitted from a light-emitting portion (not illustrated) of the eyepiece detection unit 57 is reflected on the object and is received by a light-receiving portion (not illustrated) of an infrared proximity sensor. The distance to which the object approaches from the eyepiece portion 16 (eyepiece distance) can also be determined by the amount of the received infrared light. In this way, the eyepiece detection unit 57 performs eyepiece detection which detects an approach distance of the object to the eyepiece portion 16. In the case where an object which approaches within a predetermined distance of the eyepiece portion 16 is detected in a non-eye approach state (non-approach state), it is detected that the eye approaches. In a case where the object of which the approach is detected is separated from the eyepiece portion 16 by a predetermined distance or longer in an eye approach state (approach state), it is detected that the eye is separated. The threshold value for detecting the eyepiece and the threshold value for detecting the eye separation may be different by providing, for example, a hysteresis. After the eyepiece is detected, the eye approach state is assumed until the eye separation is detected. After the eye separation is detected, the non-eye approach state is assumed until the eyepiece is detected. Note that the infrared proximity sensor is an example, and other sensors may be adopted as the eyepiece detection unit 57 as long as the sensors can detect a state that can be regarded as the eyepiece.

Various setting values of the camera including the shutter speed and the aperture are displayed on the outer finder display unit 43 via an outer finder display unit driving circuit 44.

A power supply control unit 80 includes a battery detection circuit, a DC-DC converter, a switch circuit that switches a block to be energized, and the like, and detects whether a battery is mounted, the type of battery, a remaining battery level, and the like. In addition, the power supply control unit 80 controls the DC-DC converter on the basis of a result of the detection and an instruction from the system control unit 50, and supplies a required voltage to portions including the recording medium 200 for a necessary period of time. A power supply unit 30 is a primary battery such as an alkaline battery or a lithium battery, a secondary battery such as a NiCd battery, a NiMH battery, or a lithium ion battery, an AC adapter, or the like.

A recording medium I/F 18 is an interface with the recording medium 200 such as a memory card or a hard disk. The recording medium 200 is a recording medium such as a memory card for recording a shot image and is configured with a semiconductor memory and a magnetic disk.

An operation unit 70 is an input unit that receives an operation from a user (user operation) and is used for inputting various operation instructions to the system control unit 50. As illustrated in FIG. 2, the operation unit 70 includes the mode selector switch 60, the shutter button 61, the power switch 72, the touch panel 70*a*, other operation members 70*b*, and the like. The other operation members 70*b* include the main electronic dial 71, the sub-electronic dial 73, the four-direction key 74, the SET button 75, the movie button 76, the AE lock button 77, the enlargement button 78, the playback button 79, the menu button 81, and the like.

The mode selector switch 60 switches an operation mode of the system control unit 50 to any of a still image photographing mode, a movie shooting mode, and a playback mode. Examples of the still image shooting mode include an auto shooting mode, an auto scene determination mode, a manual mode, an aperture-priority mode (Av mode), a shutter-speed priority mode (Tv mode), and a program AE mode (P mode). In addition, examples thereof also include various scene modes and custom modes serving as shooting settings for each shooting scene. A user can directly switch the operation mode to any one of these modes with the mode selector switch 60. Alternatively, the user may temporarily switch a screen to a list screen of a shooting mode with the mode selector switch 60 and then selectively switch the mode to any one of the plurality of displayed modes with another operation member. Similarly, the movie shooting mode may include a plurality of modes.

The shutter button 61 includes a first shutter switch 62 and a second shutter switch 64. The first shutter switch 62 is turned ON in the middle of an operation of the shutter button 61 in response to so-called half-press (shooting preparation instruction) and generates a first shutter switch signal SW1. The system control unit 50 starts a shooting preparation operation such as autofocus (AF) processing, automatic exposure (AE) processing, automatic white balance (AWB)

processing, or flash pre-flash (EF) processing with the first shutter switch signal SW1. The second shutter switch 64 is turned ON at completion of the operation of the shutter button 61 in response to so-called full-press (shooting instruction) and generates a second shutter switch signal SW2. The system control unit 50 starts a series of shooting processing operations from reading a signal from the imaging unit 22 to writing a captured image as an image file into the recording medium 200 with the second shutter switch signal SW2.

The touch panel 70*a* is a touch sensor that detects various touch operations on a display surface of the display unit 28 (an operation surface of the touch panel 70*a*). The touch panel 70*a* and the display unit 28 can be integrally configured. For example, the touch panel 70*a* is configured so that a transmittance of light does not hinder display on the display unit 28 and is attached to an upper layer of the display surface of the display unit 28. Then, input coordinates on the touch panel 70*a* are associated with display coordinates on the display surface of the display unit 28. As a result, it is possible to provide a graphical user interface (GUI) configured as if the user can directly operate a screen displayed on the display unit 28.

First Embodiment

Figure 3A:
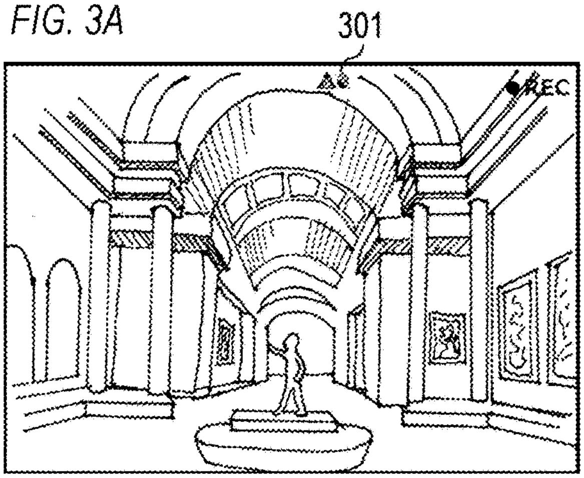
FIGS. 3A to 3C are schematic diagrams of warning displays.
Figure 3B:
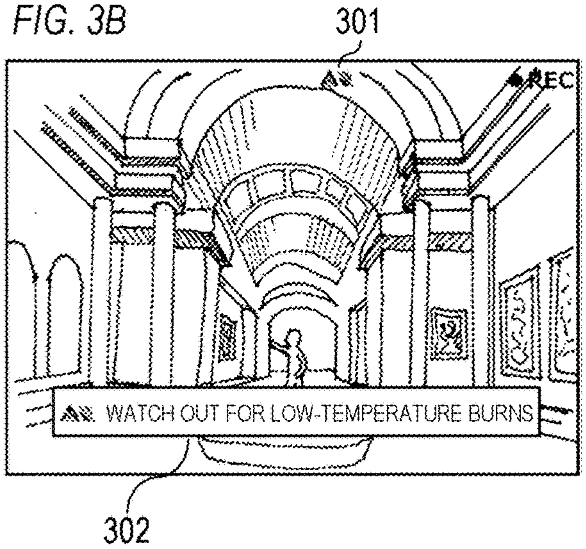
Figure 3C:

In the first embodiment, in a case where the temperature of the digital camera 100 is higher than a threshold value, there is no problem even if the digital camera 100 is touched, but there is a possibility that a low-temperature burn will occur if the digital camera is left touched on the same part of the body for a long time. Therefore, in order to call attention to a low-temperature burn, the digital camera 100 displays a warning as illustrated in FIGS. 3A to 3C. FIGS. 3A to 3C illustrate screens on which warning displays are performed. In FIG. 3A, an icon 301 is displayed as a warning display item. In FIG. 3B, the icon 301 and a guidance 302 larger than the icon 301 are displayed as warning display items. On the large guidance 302, an icon similar to the icon 301 and a call attention by characters "Watch out for low-temperature burns" are displayed. When the guidance 302 is displayed, the icon 301 may not be displayed. In FIG. 3C, full screen display is performed as the warning display, and icons and characters similar to the large guidance 302 are displayed in a larger size than the large guidance 302.

Since the icon 301 is smaller than the guidance 302 (the saliency (degree of conspicuousness) of the icon 301 is low), the warning display can be performed without blocking the live view image. Since the guidance 302 is large (the saliency of the guidance 302 is high), the user can easily notice the warning display, but the guidance 302 may interfere with the user. For example, the guidance 302 makes it difficult to confirm the object (live view image) (the guidance 302 hinders shooting). The warning display of FIG. 3C has advantages and disadvantages similar to those of the warning display of FIG. 3B. In the warning display of FIG. 3C, the user can more easily notice the warning display than the warning display of FIG. 3B, but the entire live view image is covered and the live view image cannot be checked. Therefore, in the first embodiment, the warning display is switched in consideration of the state of the digital camera 100.

Figure 4:
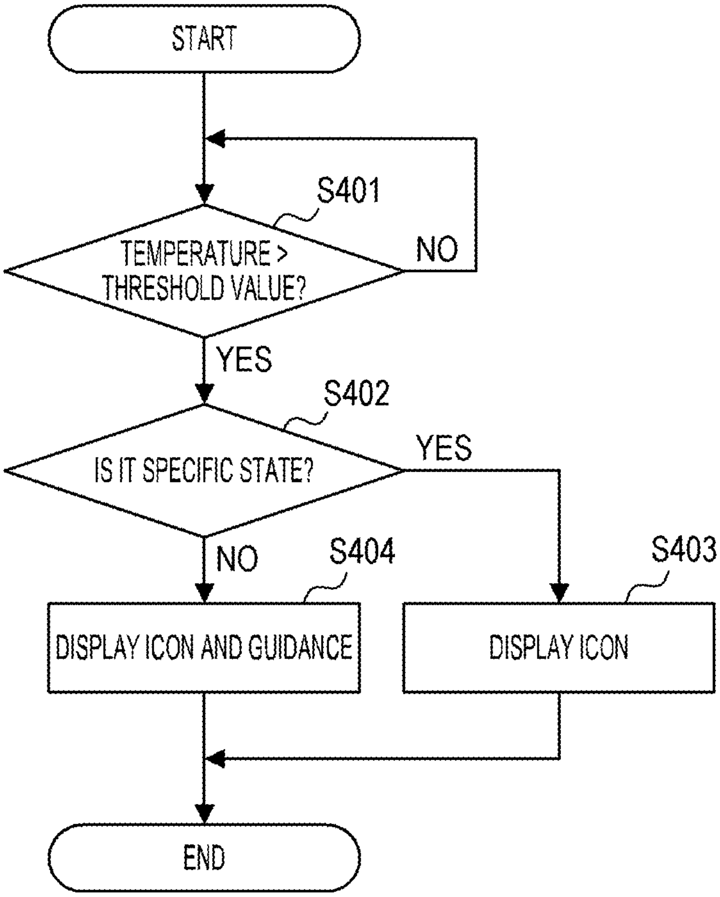
FIG. 4 is a flowchart of an operation according to a first embodiment.

FIG. 4 is a flowchart illustrating an operation according to the first embodiment. The operation in FIG. 4 is implemented by the system control unit 50 loading a program stored in the nonvolatile memory 56 into the system memory 52 and executing the program. For example, when a user operation is performed on the power switch 72 and the digital camera 100 starts up, the system control unit 50 starts the operation of FIG. 4. During the startup of the digital camera 100, the operation in FIG. 4 is repeated.

In S401, the system control unit 50 determines whether the temperature measured by the temperature measurement unit 59 is higher than the threshold value. It is repeatedly determined whether the temperature is higher than the threshold value until it is determined that the temperature is higher than the threshold value. When it is determined that the temperature is higher than the threshold value, the process proceeds to S402. The threshold value may be a predetermined fixed value or a value that can be changed by the user.

In S402, the system control unit 50 determines whether the state of the digital camera 100 is a specific state. The specific state is a state in which the digital camera 100 is not gripped (a state in which the possibility that the digital camera 100 is gripped is low). When it is determined that the state of the digital camera 100 is the specific state, the process proceeds to S403, and if not, the process proceeds to S404.

The system control unit 50 can detect one or more of the following seven States ST1 to ST7 as specific states. Note that not all of the States ST1 to ST7 need to be detectable.

State ST1: A state in which a tripod is connected to the digital camera 100

State ST2: A state in which a gimbal is connected to the digital camera 100

State ST3: A state in which a grip is connected to the digital camera 100

State ST4: A state in which a camera platform is connected to the digital camera 100

State ST5: A state in which a controller is connected to the digital camera 100

State ST6: A state in which gripping of the digital camera 100 is not detected State ST7: A state in which a specific operation mode is set in the digital camera 100

Each of the tripod, the gimbal, the grip, and the camera platform is connected to the tripod hole, and the States ST1 to ST4 can be detected using the tripod hole detection unit 51. The controller communicates with the communication unit 54 in a wired or wireless manner (connected to the communication unit 54), and the State ST5 can be detected using the communication unit 54. The State ST6 can be detected using the grip detection unit 58. The specific operation mode is an operation mode in which the digital camera 100 is not gripped (an operation mode in which the possibility of gripping the digital camera 100 is low), and is, for example, an operation mode in which time-lapse shooting or self-timer shooting is performed. The system control unit 50 grasps the set operation mode and can detect the State ST7.

In S403, the system control unit 50 causes the display unit 28 or the EVF 29 to perform the warning display in FIG. 3A (the warning display of only the icon 301). In the cases of State ST1 to State ST7, since there is a low possibility that the user holds the digital camera for a long time, the warning display of FIG. 3A is performed to make it easier to check the live view image. Note that when the temperature of the digital camera 100 falls below the threshold value, the icon 301 is hidden.

In S404, the system control unit 50 causes the display unit 28 or the EVF 29 to perform the warning display in FIG. 3B (the warning display including the icon 301 and the guidance 302). In a case where it is determined that the states are not the State ST1 to State ST7, there is a possibility that the user holds the digital camera for a long time, and thus, the warning display of FIG. 3B is performed so that the user can easily notice. Note that when the temperature of the digital camera 100 falls below the threshold value, the icon 301 and the guidance 302 are hidden. The guidance 302 may also be hidden in response to a user operation.

Second Embodiment

In a case where the temperature of the digital camera 100 is higher than the threshold value, even in a specific state where the digital camera 100 is not gripped, there is a possibility of a low-temperature burn if the user approaches the eyepiece with the eyes. Therefore, in the second embodiment, the warning display is performed in further consideration of whether the user approaches the eyepiece portion with the eyes.

Figure 5:
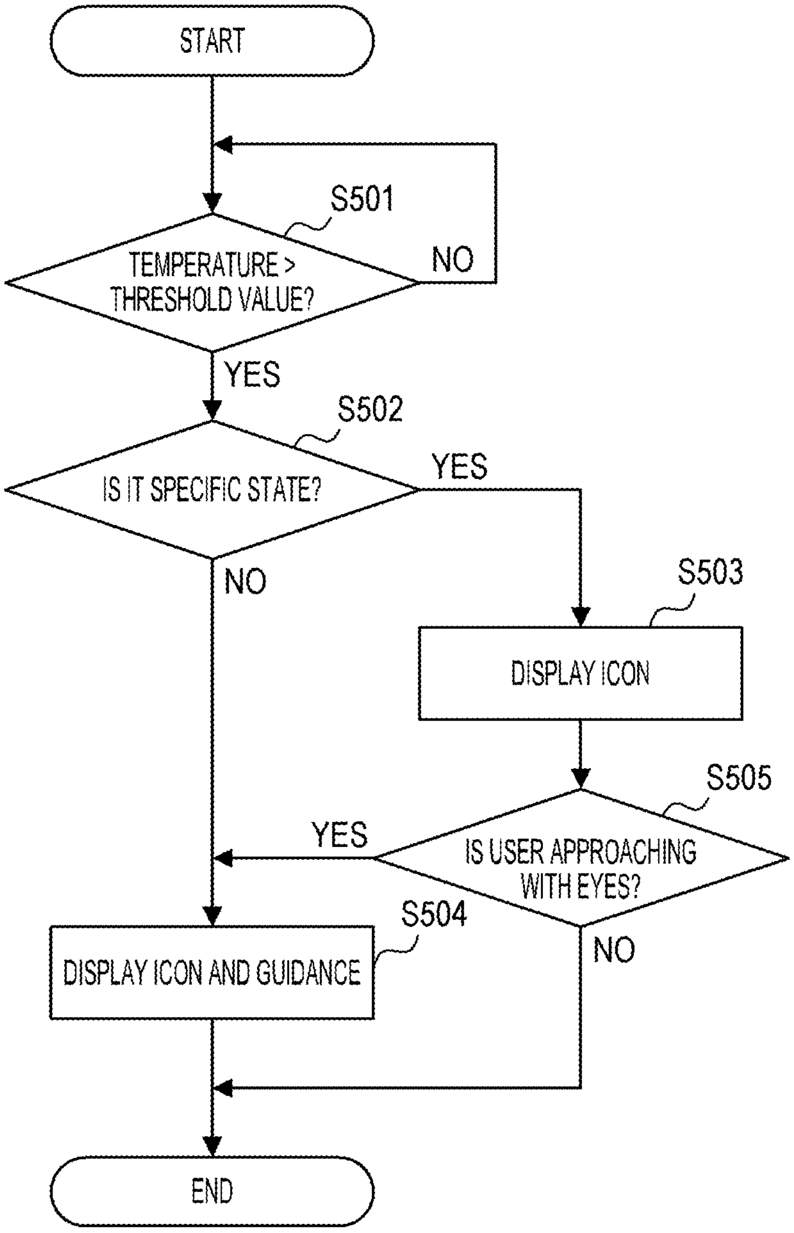
FIG. 5 is a flowchart of an operation according to a second embodiment.

FIG. 5 is a flowchart of an operation according to the second embodiment. The operation in FIG. 5 is implemented by the system control unit 50 loading a program stored in the nonvolatile memory 56 into the system memory 52 and executing the program. For example, when a user operation is performed on the power switch 72 and the digital camera 100 starts up, the system control unit 50 starts the operation of FIG. 5. During the startup of the digital camera 100, the operation in FIG. 5 is repeated.

S501 to S504 are the same as S401 to S404 in FIG. 4 described in the first embodiment. After S503, in S505, the system control unit 50 determines whether the user approaches the eyepiece portion 16 with the eyes using the eyepiece detection unit 57. When it is determined that the user approaches the eyepiece portion 16 with the eyes, the process proceeds to S504, and otherwise, the operation of FIG. 5 is ended.

Note that the order of the processing is not particularly limited. For example, the order of S503 and S505 may be switched, and when it is determined that the user approaches the eyepiece portion 16 with the eyes, the process may proceed from S505 to S504, and if not, the process may proceed from S505 to S503.

Third Embodiment

In a case where the temperature of the digital camera 100 is higher than the threshold value, even in a specific state where the digital camera 100 is not gripped, there is a possibility that a low-temperature burn occurs if the user performs an operation on the operation unit 70 (if the user touches the digital camera 100). Therefore, in the third embodiment, the warning display is performed in further consideration of whether the user is performing an operation on the operation unit 70.

Figure 6:
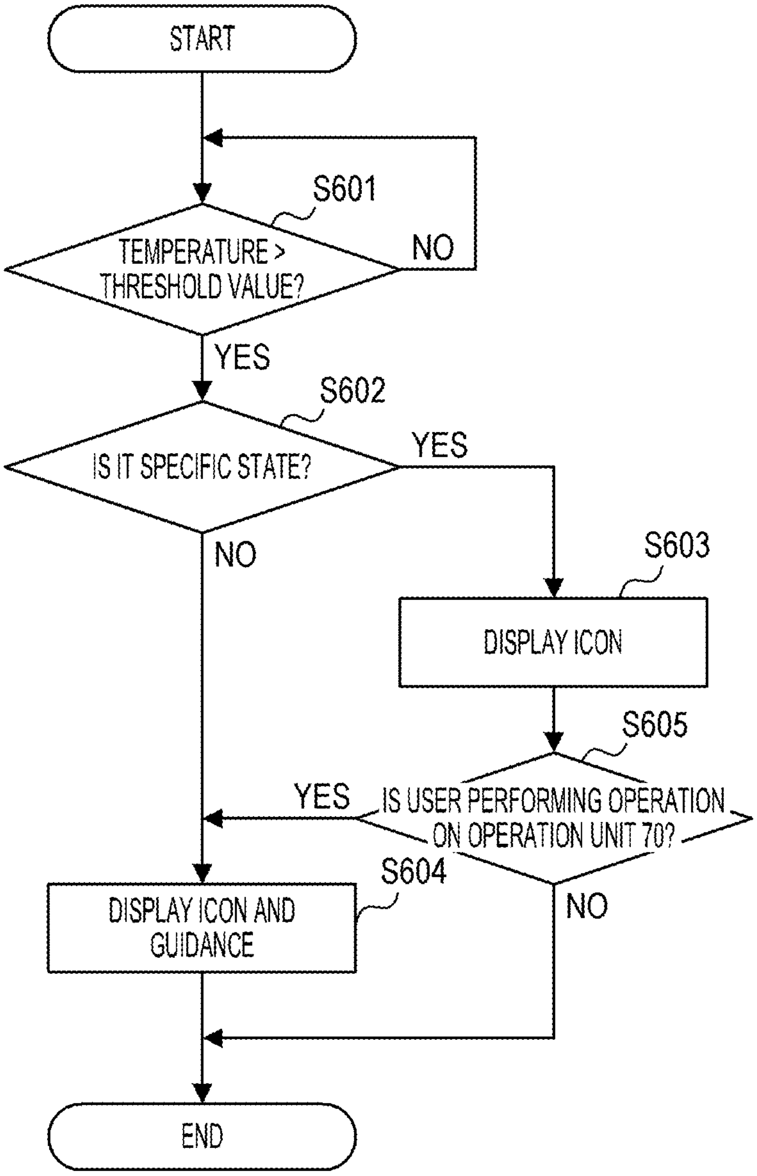
FIG. 6 is a flowchart of an operation according to a third embodiment.

FIG. 6 is a flowchart of an operation according to the third embodiment. The operation in FIG. 6 is implemented by the system control unit 50 loading a program stored in the nonvolatile memory 56 into the system memory 52 and executing the program. For example, when a user operation is performed on the power switch 72 and the digital camera 100 starts up, the system control unit 50 starts the operation of FIG. 6. During the startup of the digital camera 100, the operation in FIG. 6 is repeated.

S601 to S604 are the same as S401 to S404 in FIG. 4 described in the first embodiment. After S603, in S605, the system control unit 50 determines whether the user is performing an operation on the operation unit 70. If it is determined that the user is performing an operation on the operation unit 70, the process proceeds to S604, and if not, the operation of FIG. 6 ends.

Note that the order of the processing is not particularly limited. For example, the order of S603 and S605 may be switched, and when it is determined that the user is performing an operation on the operation unit 70, the process may proceed from S605 to S604, and if not, the process may proceed from S605 to S603.

Fourth Embodiment

The warning display cannot be performed after the power of the digital camera 100 is turned off. Therefore, it is preferable to reliably notify the user of the possibility of low-temperature burns while the power of the digital camera 100 is turned on. Therefore, in the fourth embodiment, in a case where the temperature of the digital camera 100 is higher than the threshold value, the most remarkable notification is performed when the power of the digital camera 100 is turned off. For example, the warning display of FIG. 3C is performed.

During the operation of FIG. 4, 5, or 6, when the temperature of the digital camera 100 is higher than the threshold value, the system control unit 50 determines whether to turn off the power of the digital camera 100. For example, the system control unit 50 determines to turn off the power of the digital camera 100 when the automatic power off timer expires or when the power switch 72 is operated. When it is determined that the power of the digital camera 100 is to be turned off, the system control unit 50 performs the warning display of FIG. 3C. Note that when the temperature of the digital camera 100 falls below the threshold value, the warning display ends. The warning display may also end in response to a user operation.

Fifth Embodiment

In the fifth embodiment, it is assumed that an accessory connected to the digital camera 100 includes a vibrator. For example, the accessory is a gimbal, a grip, or a controller, and the vibrator is an eccentric motor. In the first to fourth embodiments, the notification is performed by the warning display. In the fifth embodiment, notification is performed by vibration of an accessory connected to the digital camera 100. The saliency of vibration (notification) varies depending on the vibration pattern. For example, the stronger the vibration, the higher the saliency of the vibration (notification).

Sixth Embodiment

In the sixth embodiment, it is assumed that earphones or headphones are connected to the digital camera 100 in a wired or wireless manner. In the sixth embodiment, notification is performed by audio output from an earphone or a headphone connected to the digital camera 100. The saliency of the audio output (notification) varies depending on the pattern of the audio output. For example, the larger the volume, the higher the saliency of the audio output (notification). Furthermore, the longer the audio output time, the higher the saliency of the audio output (notification).

Seventh Embodiment

In the seventh embodiment, notification (notification other than notification of low-temperature burn) can be performed regardless of whether the temperature of the digital camera 100 is higher than the threshold value. Hereinafter, the notification other than the notification of the low-temperature burn is referred to as "another notification". When detecting a state in which another notification is necessary, the system control unit 50 performs the other notification with saliency regardless of whether a specific state is detected. For example, a warning display such as display of an icon, display of guidance, display of an icon and guidance, or full screen display is performed. Note that a method of detecting a state requiring another notification is not particularly limited. Furthermore, the saliency of another notification may be fixed in advance or may vary depending on the state of the digital camera 100.

According to each of the embodiments described above, only in a case where it is determined that there is a possibility of a low-temperature burn, notification that is easier for the user to check is performed, and in a case where there is a low possibility of a low-temperature burn, notification that is easier for the user to check the live view image is performed. Therefore, it is possible to notify the user of the low-temperature burn while reducing the occurrence of the trouble.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the object matter of the present invention are also included in the present invention. The present invention also includes other configurations obtained by suitably combining various features of the embodiment.

Furthermore, in the above-described embodiment, a case where the present invention is applied to a digital camera is described as an example, but the present invention is not limited to this example and can be applied to other electronic devices. Of course, the present invention can also be applied to a smartphone instead of a digital camera.

According to the present invention, it is possible to reduce the warning notification from interfering with the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-044015, filed on Mar. 19, 2024, which is hereby incorporated by reference herein in its entirety.

What is claimed is:

1. An electronic device comprising:

a processor; and a memory storing a program which, when executed by the processor, causes the electronic device to execute measurement processing of measuring a temperature of the electronic device, execute detection processing of detecting a specific state wherein the electronic device is not gripped, and execute control processing of performing control to perform a first notification if the specific state is detected, and performing control to perform a second notification more conspicuous than the first notification if the specific state is not detected, in a case where the temperature of the electronic device is higher than a threshold value.

2. The electronic device according to claim 1, wherein the specific state includes at least one state among:

a state wherein a tripod is connected to the electronic device;

a state wherein a gimbal is connected to the electronic device;

a state wherein a grip is connected to the electronic device;

a state wherein a camera platform is connected to the electronic device;

a state wherein a controller is connected to the electronic device;

a state wherein gripping of the electronic device is not detected; and a state wherein a specific operation mode is set in the electronic device.

3. The electronic device according to claim 1, wherein in a case where the temperature of the electronic device is higher than the threshold value, even if the specific state is detected, if an eyepiece with respect to the electronic device is detected, control is performed to perform the second notification in the control processing.

4. The electronic device according to claim 1, wherein in a case where the temperature of the electronic device is higher than the threshold value, even if the specific state is detected, if an operation is performed on an operation member provided on the electronic device, control is performed to perform the second notification in the control processing.

5. The electronic device according to claim 1, wherein in the control processing, in a case where the temperature of the electronic device is higher than the threshold value, control is performed to perform a third notification more conspicuous than the second notification when a power of the electronic device is turned off.

6. The electronic device according to claim 5, wherein the third notification is performed by full screen display.

7. The electronic device according to claim 1, wherein the first notification is performed by displaying a first item, and the second notification is performed by displaying a second item larger than the first item.

8. The electronic device according to claim 1, wherein each of the first notification and the second notification is performed by vibration of an accessory connected to the electronic device.

9. The electronic device according to claim 8, wherein the accessory is a gimbal, a grip, or a controller.

10. The electronic device according to claim 1, wherein each of the first notification and the second notification is performed by audio output from an earphone or a headphone connected to the electronic device.

11. The electronic device according to claim 1, wherein in the control processing, control is performed such that notification regardless of whether the temperature of the electronic device is higher than the threshold value is performed with saliency regardless of whether the specific state is detected.

12. A control method of an electronic device, comprising:

measuring a temperature of the electronic device;

detecting a specific state wherein the electronic device is not gripped; and performing control to perform a first notification if the specific state is detected, and performing control to perform a second notification more conspicuous than the first notification if the specific state is not detected, in a case where the temperature of the electronic device is higher than a threshold value.

13. A non-transitory computer readable medium that stores a program, wherein the program causes a computer to execute a control method of an electronic device, the control method comprising:

measuring a temperature of the electronic device;

detecting a specific state wherein the electronic device is not gripped; and performing control to perform a first notification if the specific state is detected, and performing control to perform a second notification more conspicuous than the first notification if the specific state is not detected, in a case where the temperature of the electronic device is higher than a threshold value.

* * * * *